(12) United States Patent
Kei

(10) Patent No.: US 11,838,612 B2
(45) Date of Patent: Dec. 5, 2023

(54) ELECTRONIC APPARATUS

(71) Applicant: CANON KABUSHIKI KAISHA, Tokyo (JP)

(72) Inventor: Hidetoshi Kei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 17/551,315

(22) Filed: Dec. 15, 2021

(65) Prior Publication Data

US 2022/0201178 A1   Jun. 23, 2022

(30) Foreign Application Priority Data

Dec. 17, 2020 (JP) ................. 2020-209338

(51) Int. Cl.
| | |
|---|---|
| H04N 23/53 | (2023.01) |
| G02B 17/04 | (2006.01) |
| G02B 13/06 | (2006.01) |
| H04N 23/63 | (2023.01) |

(52) U.S. Cl.
CPC ........... *H04N 23/531* (2023.01); *G02B 13/06* (2013.01); *G02B 17/04* (2013.01); *H04N 23/633* (2023.01)

(58) Field of Classification Search
CPC .... H04N 23/531; H04N 23/633; G02B 17/04; G02B 13/06
See application file for complete search history.

(56) References Cited

U.S. PATENT DOCUMENTS 10,241,382 B2   3/2019  Sato et al.
2015/0029380 A1*  1/2015  Noh ............... H04N 23/531
                                                        348/333.01

FOREIGN PATENT DOCUMENTS

JP        2015-227901 A    12/2015

* cited by examiner

*Primary Examiner* — Minh Q Phan
(74) *Attorney, Agent, or Firm* — Cowan, Liebowitz & Latman, P.C.

(57) ABSTRACT

An electronic view finder unit provided in an image pickup apparatus is movable between a retracted state in which the electronic view finder unit is retracted in a main body and a projecting state in which the electronic view finder unit projects from the main body. The electronic viewfinder unit includes a viewfinder having a display device, an eyepiece portion, and a lens holder. The eyepiece portion is slidable between an inserted position and an extracted position in the optical axis direction of the lens. At the position where, in the projecting state, the eyepiece portion is extracted, the viewfinder is rotatable around an axis orthogonal to the optical axis of the lens. Both during the rotating operation of the viewfinder and in a state in which the rotating operation has completed, the movement of the eyepiece portion from the extracted position to the inserted position is limited.

5 Claims, 14 Drawing Sheets

ELECTRONIC APPARATUS

BACKGROUND OF THE INVENTION

Field of the Invention

The present invention relates to an electronic apparatus provided with a movable display.

Description of the Related Art

Some electronic viewfinders (hereinafter, referred to simply as a "finder") provided in an image pickup apparatus have a configuration in which the finder can move between a state in which the finder is retracted in a main body (retracted state) and a state in which the finder projects from the main body (projecting state). In image pickup apparatus disclosed in Japanese Patent Laid-Open Publication No. 2015-227901, when not in use, the finder is retracted in the camera body, and when in use, the finder slides toward the upper portion of the camera body due to a lever operation and the finder transitions to a projecting state.

In the prior art disclosed in Japanese Patent Application Laid-Open No. 2015-227901, it is impossible to change an angle of the finder in accordance with a shooting posture of a photographer because the finder cannot rotate in the projecting state.

Additionally, the finder that can be retracted in the main body of the image pickup apparatus is configured to be slidable between a position where a viewfinder eyepiece portion is used and a position where the viewfinder eyepiece portion is not used in the optical axis direction. That is, when the finder is retracted, the finder is at the position when not in use where the finder is inserted, so that a space can be saved. Therefore, if the position changes from the position when in use to the position when not in use due to an unintended contact with the finder eyepiece during operation, the convenience for the user may be impaired.

SUMMARY OF THE INVENTION

The present invention is to provide an electronic apparatus that is provided with a finder capable of moving between a state retracted into a main body and a state projecting from the main body, and that can suppress the transition of the finder that is rotatable in the projecting state to an unintended state.

An electronic apparatus according to the embodiment of the present invention is an electronic apparatus that can move between a retracted state in which a display is retracted in a main body and a projecting state in which the display projects from the main body, the display comprising: a viewfinder having a movable eyepiece portion; and a limiting unit configured to limit a movement of the eyepiece portion, wherein if the viewfinder is rotated around an axis orthogonal to a moving direction of the eyepiece portion in the projecting state, the limiting unit limits the movement of the eyepiece portion.

Further features of the present invention will become apparent from the following description of experimental embodiments with reference to the attached drawings.

DESCRIPTION OF THE EMBODIMENTS

Figure 1A:
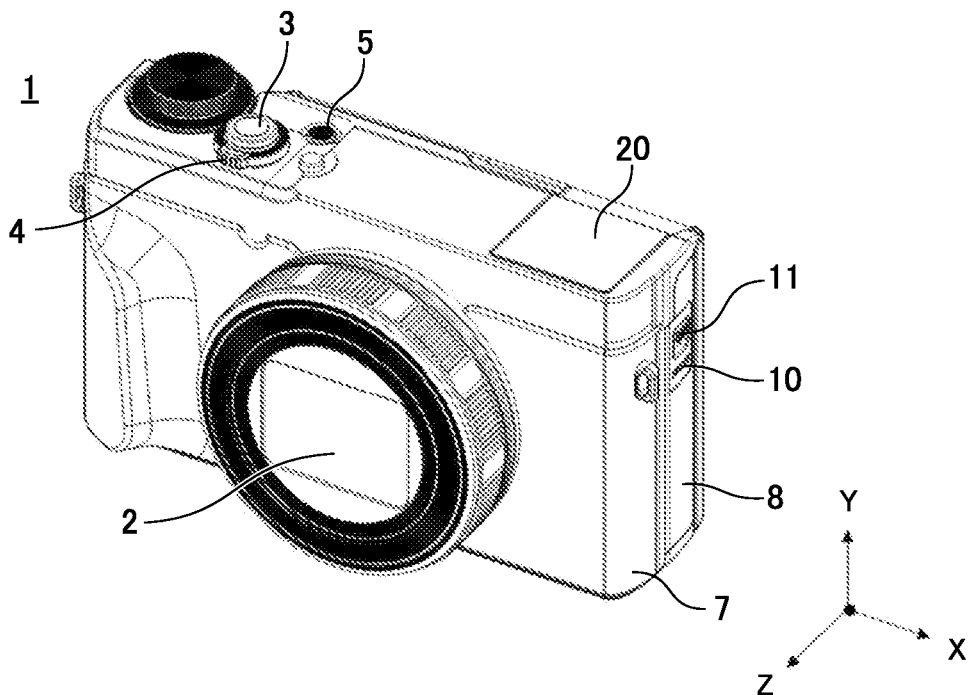
FIGS. 1A and 1B are perspective views of an image pickup apparatus according to the present embodiment.

A preferred embodiment of the present invention will now be described in detail with reference to the accompanying drawings. In each drawing, the same reference numerals are provided for components that are the same, and redundant descriptions will be omitted. Although an example of an application to an image pickup apparatus provided with a movable finder is described in the present embodiment, the present invention can be applied to various electronic devices provided with a movable display unit.

Figure 1B:
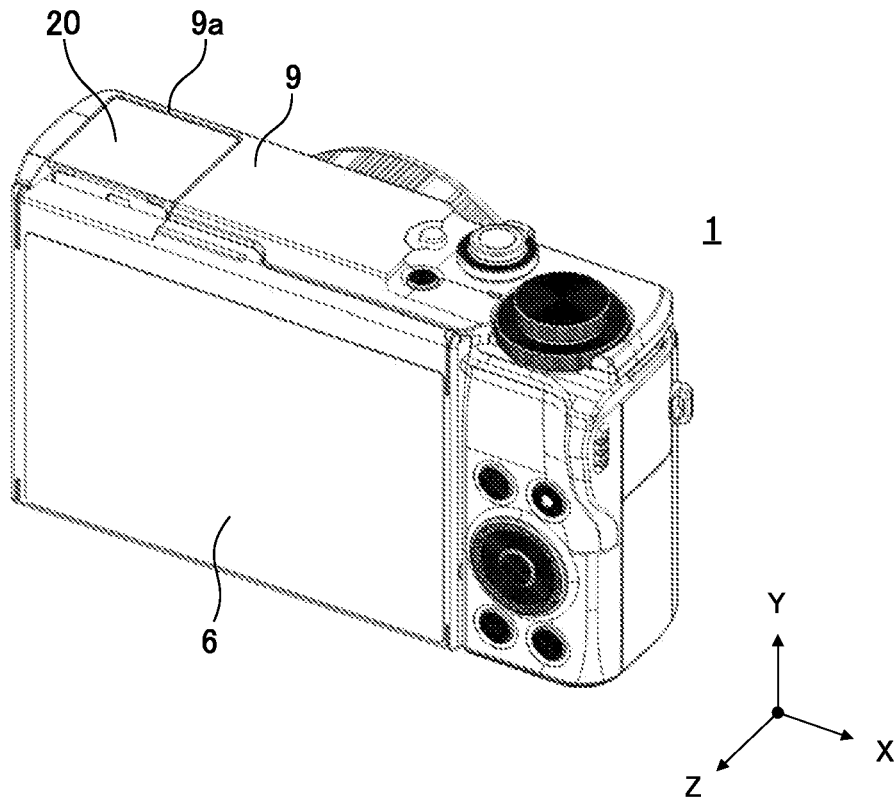

With reference to FIGS. 1A and 1B, a configuration example of an image pickup apparatus 1 according to the present embodiment will be described. FIGS. 1A and 1B are perspective views of the image pickup apparatus 1 and illustrate a state in which a finder unit 20 is retracted. FIG. 1A is a front perspective view of the image pickup apparatus 1 and FIG. 1B is a rear perspective view of the image pickup apparatus 1. In the image pickup apparatus 1 shown in FIG. 1A, the right and left direction (horizontal direction) of the image pickup apparatus 1 is defined as the X direction, and the right side when viewed from the object side is defined as the plus side. The upper and lower direction (vertical direction) of the image pickup apparatus 1 is defined as the Y direction and the upper side is defined as the plus side. The Y direction is a direction in which the finder unit 20 moves from a retracted state to a projecting state. The optical axis direction of a lens barrel unit 2 is defined as the Z direction and the object side is defined as the plus side. The X, Y, and Z directions in the other drawings are based on the definition in FIG. 1A.

The image pickup apparatus 1 is configured by the lens barrel unit 2 provided with an imaging optical system and an apparatus main body (hereinafter, referred to as a "main body"). The lens barrel unit 2 is collapsed in the image pickup apparatus 1 when it is retracted. The main body is provided with a small movable electronic view finder (EVF). The main body is provided with an image pickup element (not illustrated), and generates image data by performing photoelectric conversion of an optical image of an object formed through a plurality of shooting lenses configuring the imaging optical system. Additionally, in the main body, a main substrate, an auxiliary substrate, and the like on which a processing circuit that converts image data obtained from the image pickup element into digital information is mounted are provided.

The main body is provided with a plurality of operation members. A release button 3 is disposed on the upper surface of the main body, and when a user performs a full-pressing operation, a shooting operation starts, and image data of an object image are recorded on a recording medium (not illustrated). A zoom lever 4 is a rotatable operation member disposed on the outer periphery of the release button 3 and performs a zooming operation according to a rotation operation. A power button 5 is used for switching between an ON state (usage state) in which the power button 5 is pressed by the user and an OFF state (non-use state). A display device 6 is provided on the rear surface of the image pickup apparatus 1, and is used for confirming an object to be shot and reproducing and displaying a shot image.

The main body of the image pickup apparatus 1 is covered with a front cover 7, a rear cover 8, and a top cover 9, which serve as outer members. The top cover 9 has a portion for forming an appearance surface of the upper portion of the image pickup apparatus 1 and a portion for forming an opening 9a of the finder unit 20. A side cover 10 forms a part of an appearance surface on the side surface of the main body of the image pickup apparatus 1.

The finder unit 20 is held inside the main body by a lock mechanism in the retracted state shown in FIG. 1. A release lever 11 is held on the side cover 10 that is to be slidably operated. When the user operates the release lever 11, the lock of the finder unit 20 is released, and the finder unit 20 projects upward in the Y direction of the image pickup apparatus 1 due to a biasing member (refer to projecting spring 38 in FIG. 4).

Figure 2:
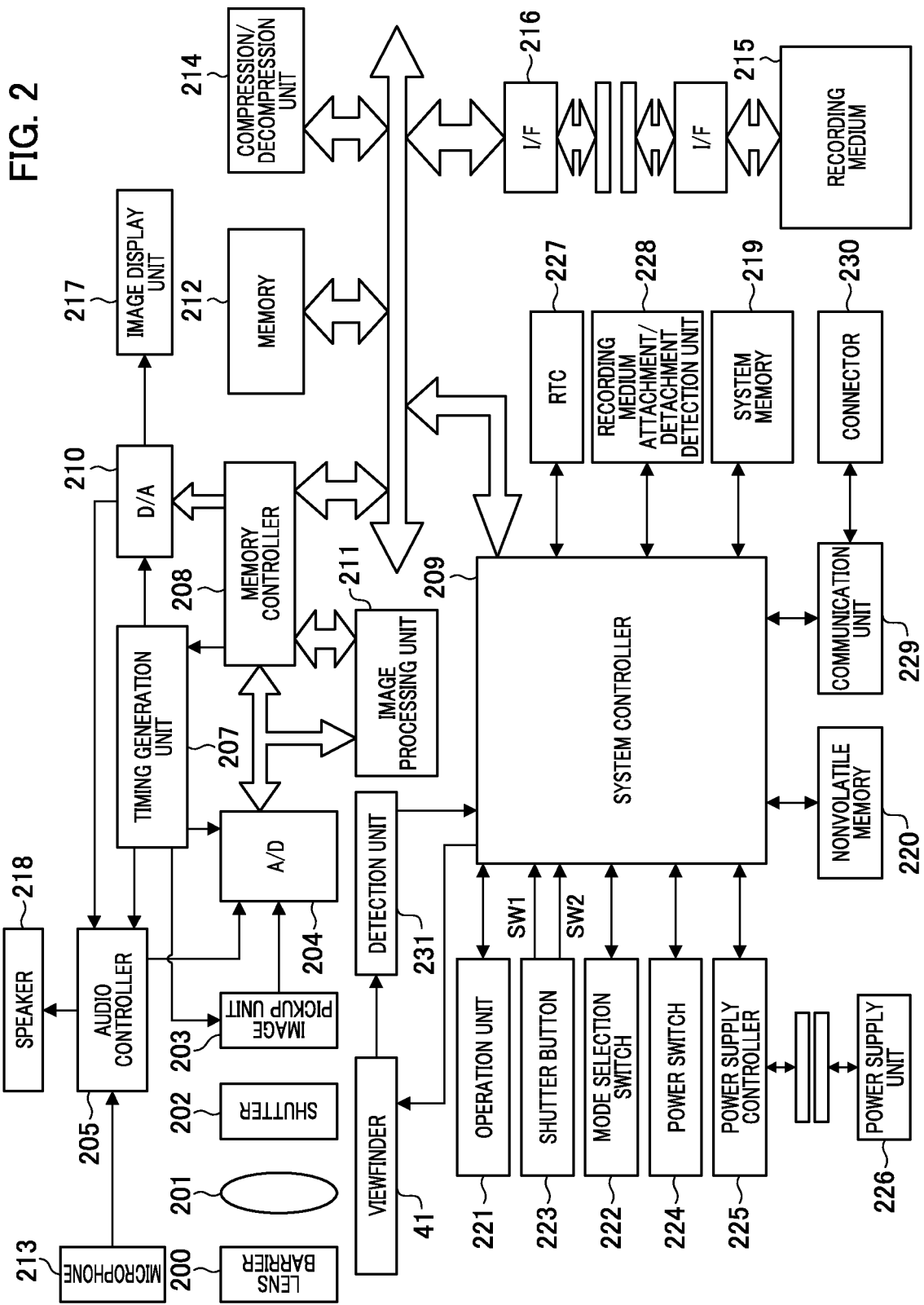
FIG. 2 is a block diagram illustrating the entire configuration according to the present embodiment.

FIG. 2 is a block diagram illustrating a configuration example of an image pickup system including the lens barrel unit 2 and the main body. The optical system has a shooting lens 201 and a shutter 202 having a diaphragm function. A lens barrier 200 covers a portion including the shooting lens 201 in order to reduce dirt.

An image pickup unit 203 includes image pickup elements such as a CCD (charge-coupled device) sensor and a CMOS (complementary metal-oxide-semiconductor) sensor. The image pickup element converts an optical image input through the optical system into an electric signal. An A/D converter 204 converts an analog signal from the image pickup unit 203 into a digital signal, or converts an analog signal from an audio controller 205 into a digital signal. A timing generation unit 207 is controlled by a memory controller 208 and a system controller 209, and supplies a clock signal and a control signal to the image pickup unit 203, the A/D converter 204, the audio controller 205, and a D/A converter 210.

An image processing unit 211 performs processing such as pixel interpolation, resizing, and color conversion on the output data from the A/D converter 204 and the data stored in a memory 212. The image processing unit 211 performs calculations on the image data acquired by image pickup, and the system controller 209 performs exposure control, distance measurement control and the like based on the calculation result. Thus, the AF (auto focus) processing of the TTL (through-the-lens) system, the AE (automatic exposure) processing, and the EF (flash pre-emission) processing of are performed. The image processing unit 211 further performs AWB (auto white balance) processing of the TTL system based on the result of the calculation processing using the image data acquired by image pickup.

The output data of the A/D converter 204 are written into the memory 212 via the image processing unit 211 and the memory controller 208, or directly via the memory controller 208. The memory 212 stores audio data acquired by a microphone 213, a still image, and a moving image after shooting, and information added to an image such as a file header when an image file is configured. The memory 212 has a storage capacity sufficient for storing a predetermined number of still images, moving images, and audio data for a predetermined time.

A compression/decompression unit 214 writes data in which a shot image stored in the memory 212 with the operation of the shutter 202 as a trigger has been read, and the compression processing has been performed by using adaptive discrete cosine transform (ADCT) or the like in the memory 212. The compression/decompression unit 214 also writes the data in which the compressed image has been read from the memory 212 and the decompression processing has been performed in the memory 212. The image data written in the memory 212 by the compression/decompression unit 214 are file-converted by the system controller 209 and recorded in a recording medium 215 via a recording medium I/F (interface) 216.

The memory 212 is a memory that also serves as an image display memory. An image display unit 217 acquires display image data written in the memory 212 from the D/A converter 210 and displays them. An audio signal output from the microphone 213 is converted into a digital signal by an A/D converter 204 via the audio controller 205 configured by an amplifier and the like, and is subsequently stored in the memory 212 by the memory controller 208. In contrast, the recorded audio data of the recording medium 215 are read into the memory 212, processed by the audio controller 205 via the D/A converter 210, and then sound is generated from a speaker 218.

The system controller 209 includes a CPU (central processing unit) and controls the entire image pickup apparatus. A system memory 219 stores constants, variables, programs, and the like for the operation of the system controller 209. A nonvolatile memory 220 is electrically erasable and recordable, and an EEPROM (Electrically Erasable Programmable Read-Only Memory) or the like is used as the nonvolatile memory 220.

An operation unit 221, a mode selection switch 222, a shutter button 223, and a power switch 224 are exemplified as operation means used for various operation instructions. The operation unit 221 is configured by various buttons and a touch panel. The mode selection switch 222 is used for switching to various modes such as still image shooting, continuous shooting, moving image shooting, and reproduction. The state of the shutter switch (SW1, SW2) is determined by the operation of the shutter button 223. The first switch SW1 is turned on by the half-pressing operation for the shutter button 223, and provides an instruction for starting operations such as the AF processing, the AE processing, the AWB processing, and the EF processing. The second switch SW2 is turned on by the full-pressing operation for the shutter button 223, and provides an instruction for starting an operation for a series of image pickup processes from the reading of signals from the image pickup unit 203 to the writing of image data on the recording medium 215. The user performs the setting of a direction key or a setting button and the like while viewing a screen of the image display unit 217, and thus, can operate an icon or a touch panel. The power switch 224 is used for switching the turning on and off of the power supply.

A power supply controller 225 performs detection of a battery and the like, and controls the DC-DC converter and performs switching control for an energization block and the like based on the detection result and an instruction from the system controller 209. The power supply controller 225 controls the power supply for each component including the recording medium 215. A power supply unit 226 includes a primary battery or a secondary battery, an AC adapter, and the like. The power supply unit 226 and the power supply controller 225 are connected by a power supply connector.

A RTC (Real Time Clock) 227 holds a power supply unit therein, and measures time independently of the power supply from the power supply unit 226. The system controller 209 performs timer control by using date and time data acquired from the RTC 227 when starting the system. A recording medium attachment/detachment detection unit 228 detects whether or not the recording medium 215 is attached to a recording medium slot, and outputs a detection signal to the system controller 209. A communication unit 229 performs communication processing according to various communication protocols. A communication connector 230 (an antenna in wireless communication) communicates and connects the image pickup apparatus 1 to an external device by the communication unit 229.

A detection unit 231 includes a detection sensor substrate (a detection sensor substrate 71 in FIG. 5) to be described below and detects whether or not a finder 41 has been extracted and is in a usable state. The detection unit 231 performs the detection by using a sensor that uses mechanical and optical methods. When the detection unit 231 detects that the finder 41 is in a usable state and further detects that a user views the finder 41, the system controller 209 performs control to switch a display image on the image display unit 217 to display the image on the screen of the finder 41. The user can confirm the image displayed on the screen of the finder 41.

Figure 3A:
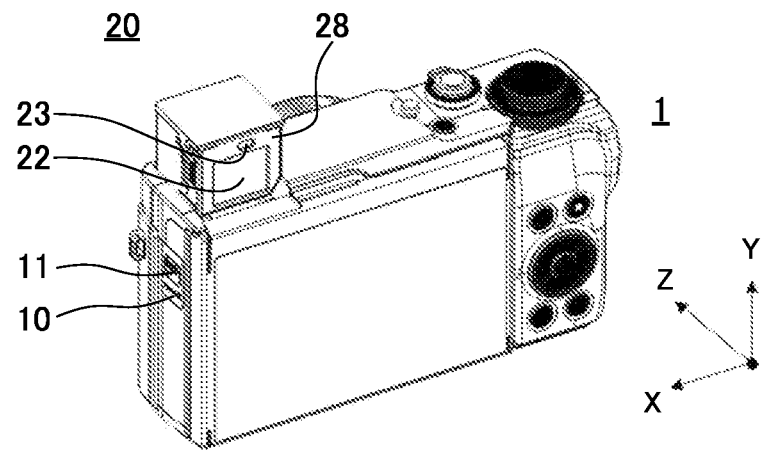
FIGS. 3A to 3C are perspective views of the image pickup apparatus in a state in which a finder unit projects.
Figure 3B:
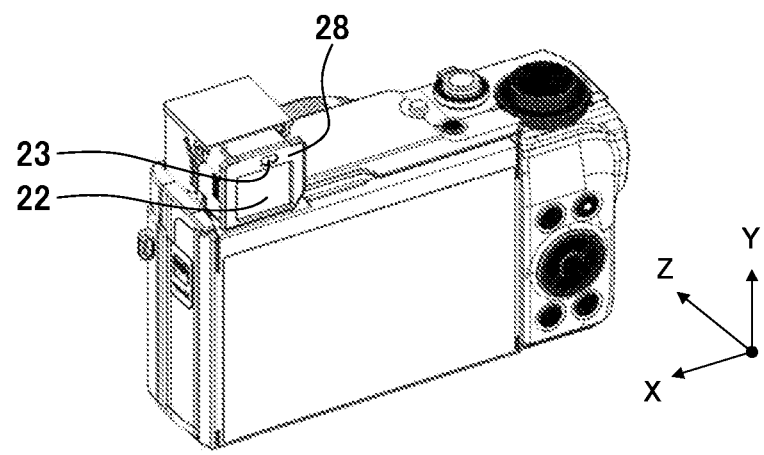
Figure 3C:
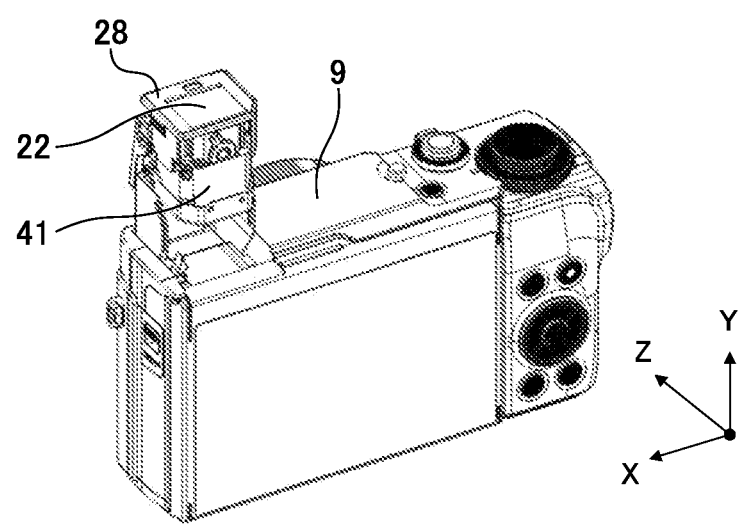

Next, the operation of the finder unit 20 will be described with reference to FIGS. 3A to 3C. FIGS. 3A to 3C are rear perspective views of the image pickup apparatus 1 for explaining the operation for projecting the finder unit 20. FIG. 3A illustrates a state in which the finder unit 20 projects upward in the Y direction from the retracted state due to the operation of the release lever 11 disposed on the side cover 10 of the image pickup apparatus 1. An eyepiece window 22 is fixed to an eyepiece portion 28. A sensor window 23 is provided on the upper side of the eyepiece window 22. The sensor window 23 is located on an optical path passing through an internal eyepiece sensor 72 (refer to FIG. 5). The eyepiece sensor 72 detects that the user views the eyepiece portion 28, and outputs a signal for switching the display of an image to the finder unit 20.

The finder unit 20 transitions from the projecting state of FIG. 3A to the state of FIG. 3B. FIG. 3B illustrates a state in which the eyepiece portion 28 is extracted toward the rear surface direction (−Z direction) of the main body portion, in the projecting state of the finder unit 20. The finder unit 20 is allowed to be used in this state, and the user can confirm, for example, an object image to be shot, and the reproduction and display of the shot image while viewing the screen of the eyepiece portion 28.

FIG. 3C illustrates a state in which the finder 41 including the eyepiece portion 28 rotates around the X axis (axis in the X direction) in the usable state shown in FIG. 3B. The finder 41 is rotated up to an angle at which the eyepiece portion 28 is parallel to the top cover 9, that is, about 90 degrees. At this time, the eyepiece window 22 faces upward (+Y direction) of the image pickup apparatus 1. Accordingly, the user can confirm the object image to be shot and the reproduction and display of the shot image from the upper surface side of the image pickup apparatus 1.

Figure 4:
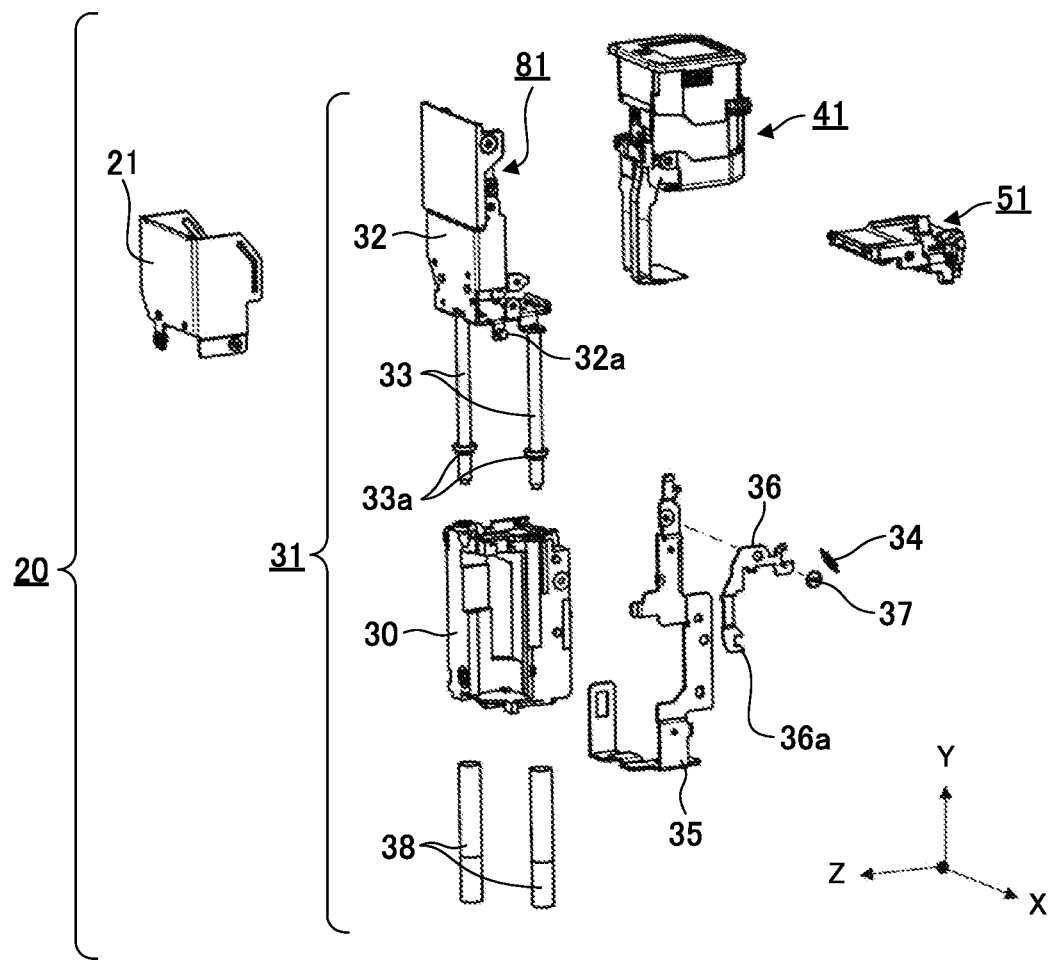
FIG. 4 is an exploded perspective view illustrating a configuration of a finder unit.

Next, with reference to FIG. 4, a configuration of the finder unit 20 will be described. FIG. 4 is an exploded perspective view of the finder unit 20. The finder unit 20 includes an outer cover 21, a pop-up mechanism unit 31, the finder 41, and a finder substrate unit 51. The outer cover 21 is a covering member that covers the side surfaces and the front surface of the finder 41. The outer cover 21 is manufactured by press-working a metal plate and configures the outer surface of the main body.

The pop-up mechanism unit 31 is slidable in the Y direction and switches the finder unit 20 between the retracted state and the projecting state. A base plate 32 is manufactured by press-working a metal plate. Two guide bars 33 and 33 formed of a metal material are fixed to the base plate 32 by caulking. A locking pin 32a is fixed to the base plate 32 by caulking. Each guide bar 33 is formed with a flange shape portion 33a, a part of which enlarges in the radial direction. A hinge device 81, which is rotatably connected to the base plate 32 about an axis in the X direction, is held on an upper part of the base plate 32 in the Y direction.

A finder holder 30 is formed of a resin material. Two guide bars 33 and 33 are inserted into the finder holder 30 to slidably hold the guide bar 33 in the Y direction. When the flange shape portion 33a of the guide bar 33 is brought into contact with the finder holder 30, the position in the Y direction when the finder unit 20 projects is determined. The finder holder 30 is fixed after being positioned with respect to the front cover 7 (refer to FIG. 1A).

The two projecting springs 38 and 38 are elastic members stored inside the finder holder 30. The projecting springs 38 bias corresponding guide bars 33 in the +Y direction. A sub plate 35 is a member manufactured by press-working a metal plate. The sub plate 35 is positioned and fixed to the finder holder 30 such that a part of the sub plate 35 is in contact with and pressed against the end portions of the projecting springs 38 and 38.

A pop-up lock lever 36 is rotatably held to the sub plate 35 by a caulking pin 37 projecting in the X direction. The pop-up (hereinafter, also referred to as the "PU") lock lever 36 includes a locking claw 36a. A biasing spring 34 is held by one end thereof being locked to the PU lock lever 36 and the other end thereof being locked to the sub plate 35. The biasing spring 34 biases the PU lock lever 36 in one direction. When the user operates the release lever 11 of FIG. 1A, the PU lock lever 36 rotates around the caulking pin 37.

In the state in which the finder unit 20 is retracted, the locking pin 32a of the base plate 32 is locked by the locking claw 36a of the PU lock lever 36. That is, the retracted state is maintained by the locking relation between these members. When the finder unit 20 is used, the PU lock lever 36 rotates due to the operation of the release lever 11 (refer to FIG. 1A) to release the locking of the locking pin 32a. The projecting operation of the finder unit 20 is performed by the force of the projection spring 38.

Figure 5:
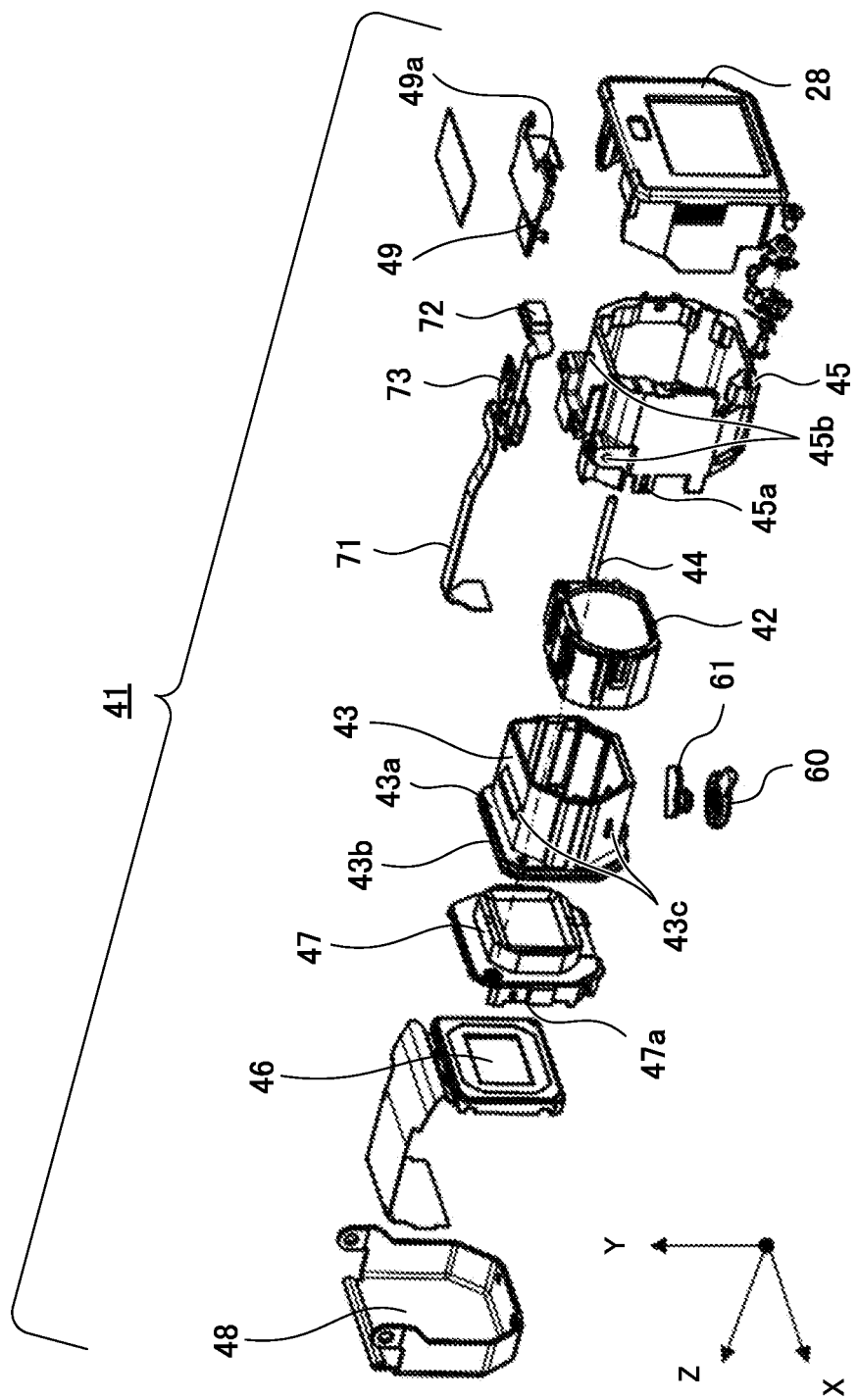
FIG. 5 is an exploded perspective view illustrating a configuration of a viewfinder.

A configuration of the finder 41 will be described with reference to the exploded perspective view of FIG. 5. The finder 41 has a display device 46, the eyepiece portion 28, a lens holder 42, and a guide barrel 43. The lens holder 42 holds an optical member (lens group) that guides a luminous flux emitted from the display device 46 to the eyepiece portion 28. The eyepiece portion 28 is movable along the optical axis direction of the optical member (lens group).

The guide barrel 43 is a guide member that movably holds the lens holder 42 in the Z direction. A guide shaft 44 is passed through a flange portion 43a of the guide barrel 43. The guide shaft 44 is a member that movably guides the guide barrel 43 in the Z direction. One end of the guide shaft 44 is fixed to a fixed barrel 45. The guide barrel 43 has a plurality of locking claws 43c on its side surfaces. The seal member 43b provided on the outer periphery of the flange portion 43a of the guide barrel 43 seals a gap between the fixed barrel 45 and the guide barrel 43, and thereby a dustproof structure is realized.

The eyepiece portion 28 is locked to the guide barrel 43 by the locking claws 43c on the side surfaces of the guide barrel 43. When the user extracts the eyepiece portion 28 in the Z direction, the guide barrel 43 pivotally supported by the guide shaft 44 translationally moves integrally with the lens holder 42 inside the guide barrel 43, and the viewfinder 41 becomes ready for use.

A display unit holder 47 is a holding member for the display device 46, in which the display device 46 is bonded and fixed with a double-sided tape. The display unit holder 47 is provided with a locking claw 47a on its side surface and is integrated by a locking portion 45a formed in the fixed barrel 45. A display unit cover 48 is a covering member that covers the back surface of the display device 46 and is positioned and fixed to the fixed barrel 45. The fixed barrel 45 is provided with a screw seat 45b for fixing to an arm plate 82 (refer to FIG. 7A) to be described below.

A cam member 61 is disposed inside the guide barrel 43, integrated with a diopter adjusting lever 60 disposed outside the guide barrel 43, and slidably fitted to the guide barrel 43. When the diopter adjusting lever 60 is rotated, the lens holder 42 moves inside the guide barrel 43 by the cam member 61 along the Z direction. That is, the user can adjust the diopter of the finder by rotating the diopter adjustment lever 60.

A detection sensor substrate 71 is a flexible wiring member electrically connected to the eyepiece sensor 72 and the extraction detection sensor 73. The eyepiece sensor 72 detects that the user is viewing the eyepiece portion 28, and outputs a signal for switching to the image display to the finder unit 20 from the display device 6 (refer to FIG. 1B). The extraction detection sensor 73 detects that the eyepiece portion 28 is extracted and outputs a signal for activating the eyepiece sensor 72. The detection sensor substrate 71 is mounted together with the eyepiece sensor 72 and the extraction detection sensor 73. The eyepiece sensor 72 and the extraction detection sensor 73 are included in the detection unit 231 shown in FIG. 2.

Figure 6A:
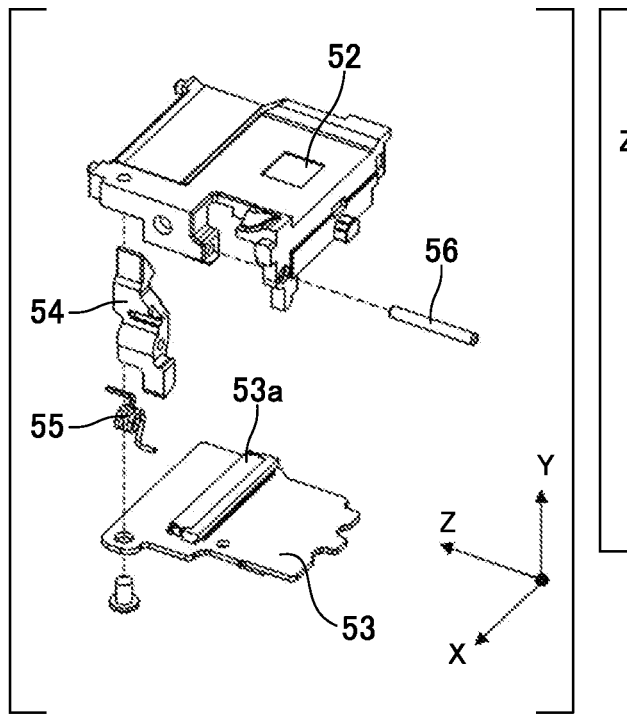
FIGS. 6A and 6B are exploded perspective views illustrating a configuration of finder substrate unit.
Figure 6B:
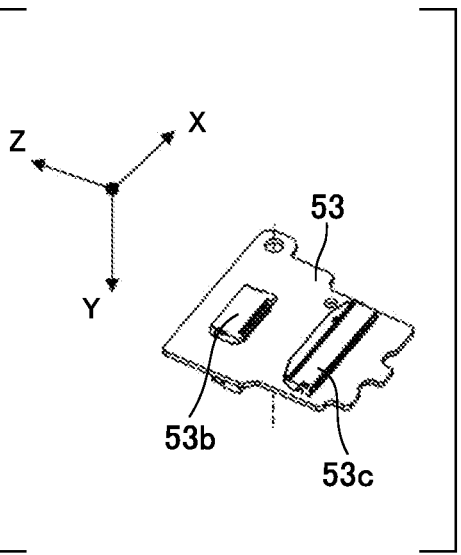

A configuration of the finder substrate unit 51 will be described with reference to FIGS. 6A and 6B. The finder substrate unit 51 is provided between the finder 41 and the pop-up mechanism unit 31. FIG. 6A is an exploded perspective view when the finder substrate unit 51 is viewed from the upper surface side, and FIG. 6B is a perspective view when a finder substrate 53 is viewed from the rear surface side. The finder substrate 53 is fixed to a finder substrate base 52.

The finder substrate 53 has a connector 53a on its upper surface side and is connected to a flexible board wired from the display device 46. The finder substrate 53 has a connector 53b and a connector 53c on its rear side. The connector 53b is connected to the detection sensor substrate 71. The connector 53c is connected to a flexible substrate (not illustrated) for transmitting an image signal and the like from a main substrate (not illustrated) in the image pickup apparatus 1.

A rotation locking member 54 is a member for locking the fixed barrel 45, and is biased in one direction by a biasing spring 55. A rotation locking shaft 56 passes through the rotation locking member 54, and both ends of the rotation locking shaft 56 are supported by the finder substrate base 52. That is, the rotation locking member 54 is a member that rotates around the rotation locking shaft 56 toward the fixed barrel 45. The rotation locking shaft 56 may be formed integrally with the rotation locking member 54.

The rotation locking member 54 is in a state of being covered with the side surface of the eyepiece portion 28 until the finder unit 20 moves from the retracted state to the state projecting in the +Y direction. In this state, the rotation locking member 54 cannot rotate in the direction in which the locking of the fixed barrel 45 is released. Accordingly, when the finder unit 20 moves from the retracted state to the projecting state, the finder 41 is maintained in a secure locking state without transitioning to an unintended state.

When the eyepiece portion 28 is extracted in the −Z direction, the rotation locking member 54 is exposed from the side surface of the eyepiece portion 28. That is, in this state, the rotation locking member 54 is rotatable in the direction in which the locking of the fixed barrel 45 is released. The finder 41 becomes rotatable in a state in which the locking of the fixed barrel 45 by the rotation locking member 54 is released.

Figure 7A:
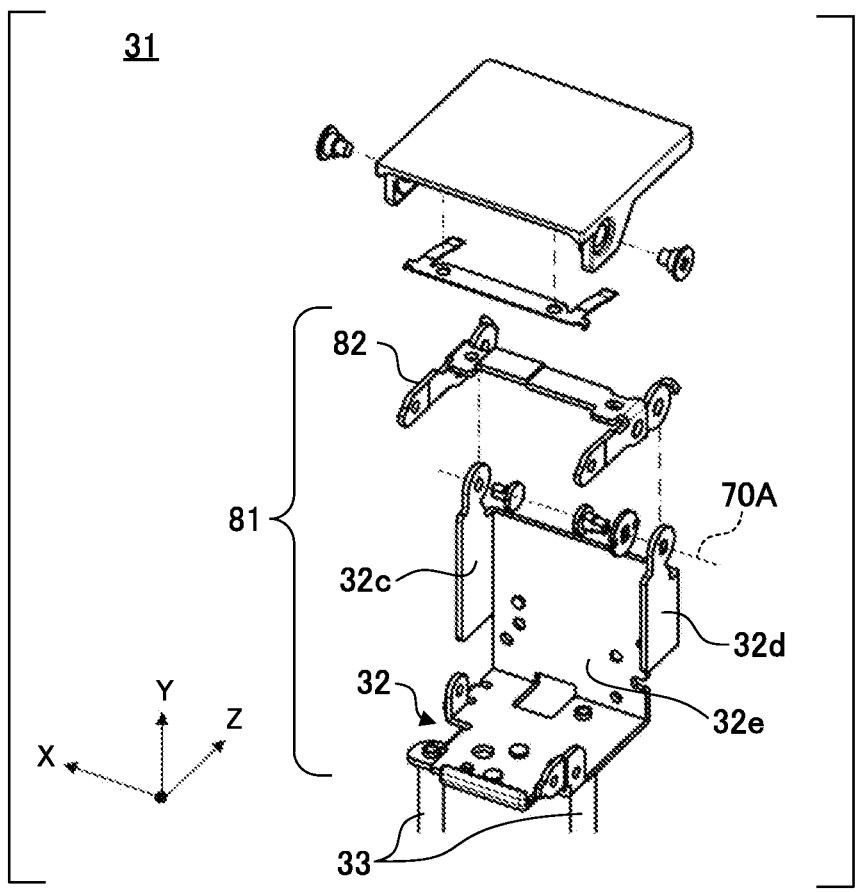
FIGS. 7A to 7C are exploded perspective views illustrating a hinge device of the finder unit.
Figure 7B:
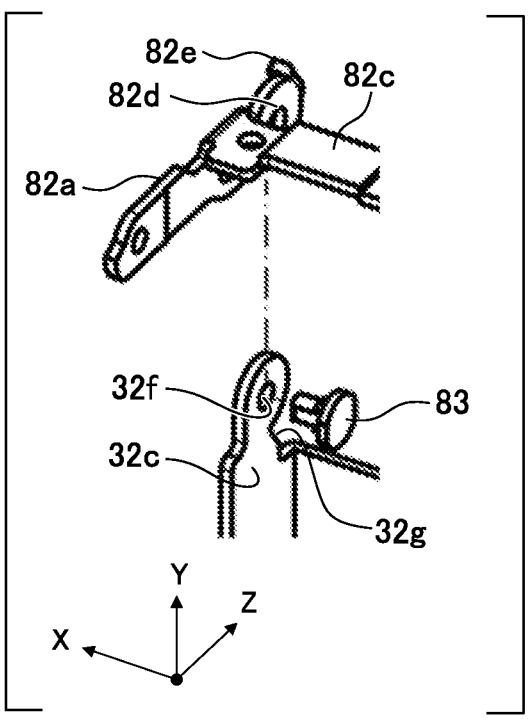
Figure 7C:
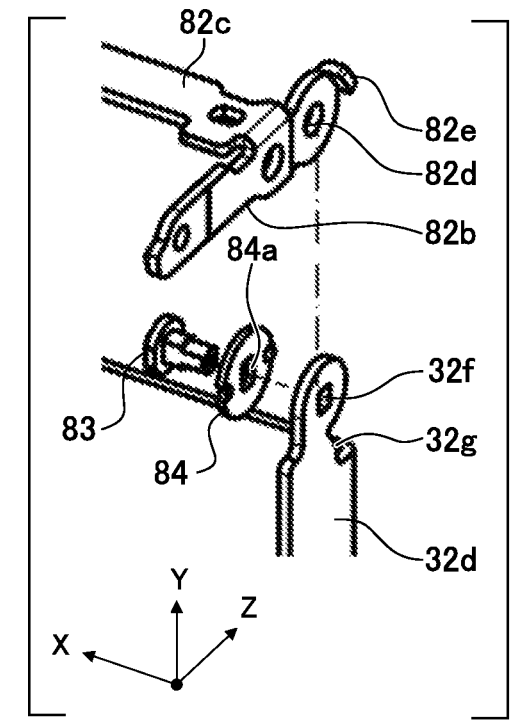

Next, with reference to FIGS. 7A to 7C, a configuration of the hinge device 81 will be described. The hinge device 81 rotatably connects the finder 41 to the main body of the image pickup apparatus 1. This rotation is a movement around the X axis. FIG. 7A is an exploded perspective view of the hinge device 81. FIG. 7B and FIG. 7C are enlarged views of a rotating shaft unit. The hinge device 81 has the base plate 32, the arm plate 82, a caulking pin 83, and a disc spring 84.

The base plate 32 is a component serving as a structural member of the finder unit 20, and is manufactured by press-working a metal plate. The base plate 32 is attached with guide bars 33 and 33, the outer cover 21, and the finder substrate unit 51 (refer to FIG. 4) as described above. The base plate 32 includes a first side face 32c and a second side face part 32d. These side faces are parallel to the optical axis direction (Z direction) of the finder lens and parallel to the movable direction (Y direction) of the finder unit 20. The first side face 32c and the second side face 32d are respectively provided with holes 32f. A rotation limiting part 32g is formed in the vicinity of the hole 32f.

The plane portion 32e extends in the Y direction in the base plate 32, and is positioned farther in the +Z direction than the first side surface 32c and the second side face 32d. The first side face 32c and the second side face 32d, which are parallel to each other, are connected to the plane portion 32e. That is, the first side surface 32c, the second side surface 32d, and the plane portion 32e are substantially formed in U-shape in a cross section (XZ plane) orthogonal to the moving direction of the finder unit 20.

The arm plate 82 is an arm member manufactured by press-working a metal plate, and includes a first arm 82a and a second arm 82b. The first arm 82a and the second arm 82b are connected by a connecting portion 82c extending in the X direction. The first arm 82a and the second arm 82b each have holes 82d. A bent portion 82e extending in the axial direction of the hole 82d is provided in the vicinity of the hole 82d.

The hole 32f of the base plate 32 and the hole 82d of the arm plate 82 are coaxially arranged. A rotation axis 70A shown by a dotted line in FIG. 7A is a central axis around which the finder 41 rotates. When the arm plate 82 rotates upward by about 90 degrees, the bent portion 82e of the arm plate 82 is brought into contact with the rotation limiting portion 32g of the base plate 32, so that an upward rotating angle of the finder 41 is limited.

The caulking pin 83 is caulked in a state of being inserted into the hole 32f of the base plate 32, the hole 82d of the arm plate 82, and a hole 84a of the disc spring 84. Thus, the arm plate 82 is rotatably connected to the base plate 32 around the rotation axis 70A, and the caulking pin 83 is prevented from dropping out. Since the disc spring 84 is fixed in a state of being bent in the rotational axis direction, a rotational torque when rotating the finder 41 around the rotational axis 70A is applied.

By the above configuration, the arm plate 82 can be held at an arbitrary rotational position with respect to the base plate 32. In the present embodiment, although an example in which the disc spring 84 is disposed only on one side (-X side) of the rotation axis 70A is described, the disc spring 84 may be disposed on both sides of the rotation axis 70A.

Figure 8:
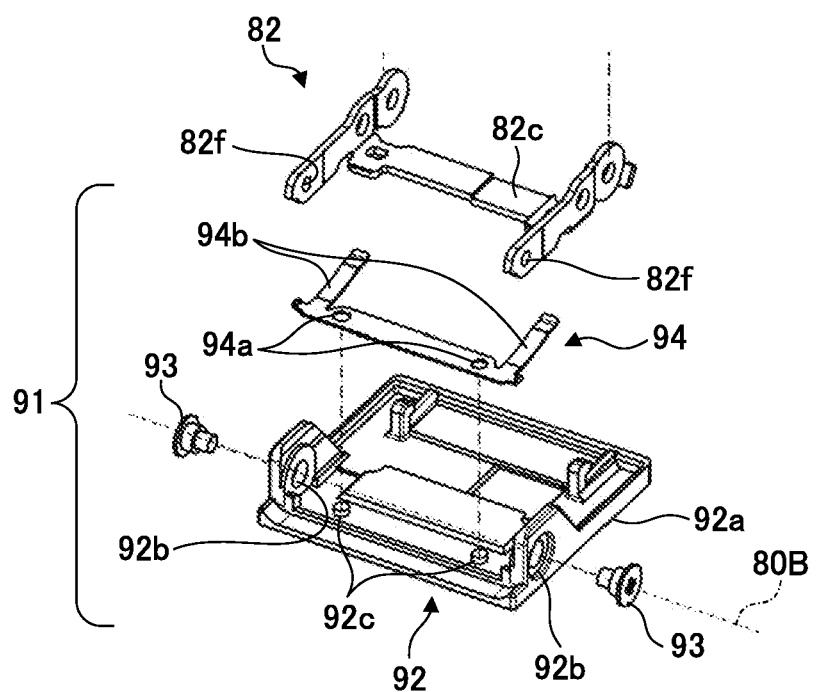
FIG. 8 is an exploded perspective view illustrating a finder top unit.

Next, with reference to FIG. 8, a configuration of a finder top unit 91 will be described. The finder top unit 91 is a member that forms the upper surface of the finder unit 20 on the externally-viewed side. FIG. 8 is an exploded perspective view of the finder top unit 91 when viewed from the back side.

The upper surface of the finder unit 20 on the appearance side is covered with a cover portion 92a of a top cover member 92. Holes 92b are respectively provided on side surfaces of the top cover member 92. The holes 92b are coaxially positioned on each side surface of the top cover member 92 such that stepped screws 93 serving as a rotating axis of the top cover member 92 are inserted. The holes 92b are provided toward the eyepiece portion 28 in the Z direction of the rotation axis 70A (FIG. 7A) of the finder 41.

In the arm plate 82, two screw holes 82f are provided coaxially to the holes 92b of the top cover member 92. The screw holes 82f are each positioned near an end portion separated from the holes 82d of each of the first arm 82a and the second arm 82b, and support the stepped screws 93 serving as a rotation axis of the top cover member 92. Two stepped screws 93 are respectively inserted into the holes 92b of the top cover member 92, and fixed by being screwed through the screw hole 82e of the arm plate 82. As a result, the top cover member 92 and the arm plate 82 are rotatably connected to each other around a rotation axis 80B shown by a dash-dotted line in FIG. 8.

A top cover biasing member 94 is a member that is substantially formed in a U-shape manufactured by press-working a metal plate and has two holes 94a. A concealed surface (rear surface) of the top cover member 92 is provided with two shafts 92c. These shafts are inserted into the holes 94a of the top cover biasing member 94, and the top cover biasing member 94 is fixed to the top cover member 92 by thermal caulking. The top cover biasing member 94 has a plurality of elastic deformation portions 94b. When the elastic deformation portion 94b is hooked to the connection portion 82c of the arm plate 82, the top cover biasing member 94 biases the top cover member 92 toward the arm plate 82. In the present embodiment, a configuration in which a leaf spring is used as a means for biasing the top cover member 92 toward the arm plate 82 is described. Elastic members such as a torsion spring and rubber may be used.

Figure 9A:
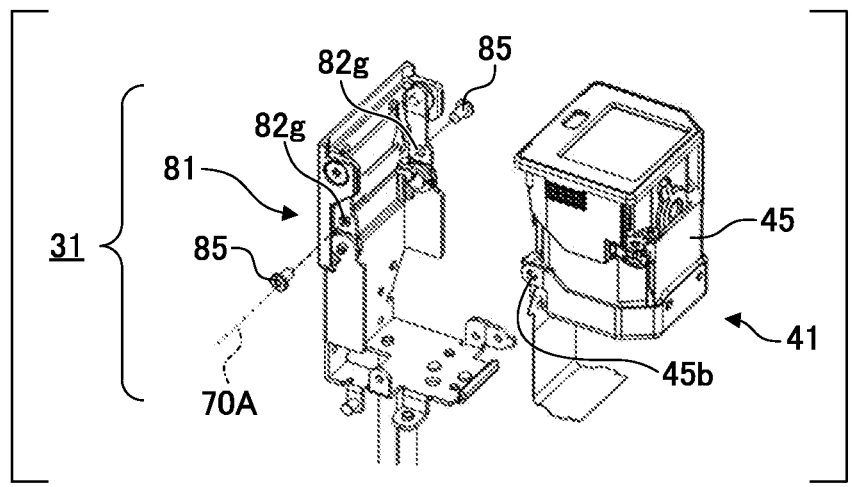
FIGS. 9A to 9C are exploded perspective views illustrating how each part of the finder unit is assembled.
Figure 9B:
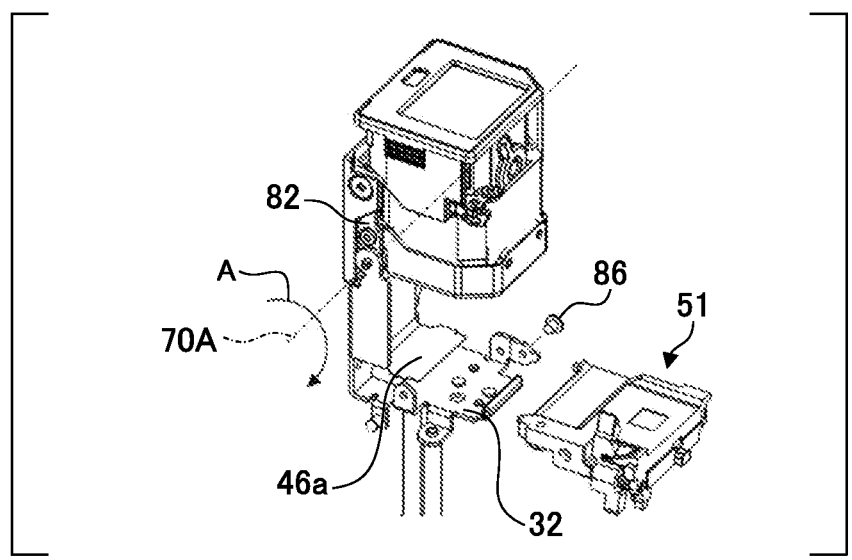
Figure 9C:
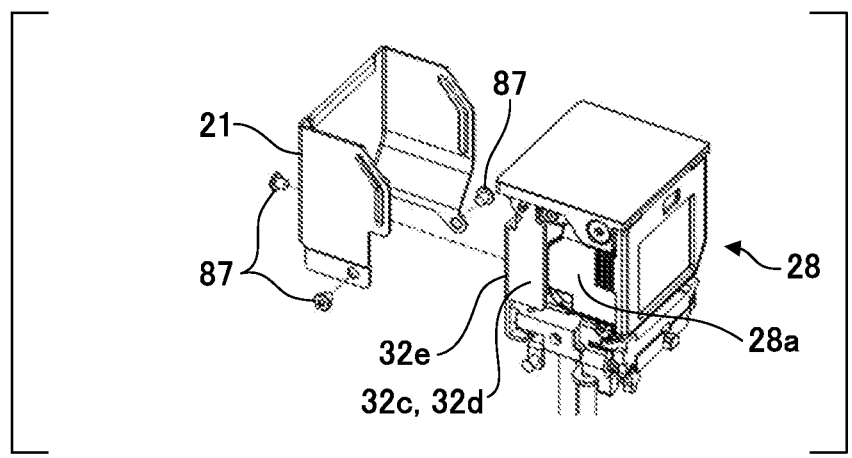

The assembly of the finder unit 20 will be described with reference to FIGS. 9A to 9C. FIGS. 9A to 9C are exploded perspective views illustrating how the finder unit 20 is assembled. FIG. 9A illustrates a state before the finder 41 is mounted on the pop-up mechanism unit 31. The fixed barrel 45 of the finder 41 is provided with fixing screw seats 45b and 45b. The arm plate 82 is provided with two holes 82g and 82g for inserting a finder fixing screw 85.

In the hinge device 81 of the pop-up mechanism unit 31, the finder 41 is assembled and positioned at the arm plate 82 in a state in which the arm plate 82 is rotated by about 90 degrees. The finder fixing screw 85 passes through the hole 82g of the arm plate 82 and is fastened to the screw seat 45b of the fixed barrel 45, and the finder 41 is fixed to the arm plate 82. Since the hinge device 81 is unitized in a state of being rotatably held in advance with respect to the pop-up mechanism unit 31, assembly of the finder 41 is facilitated.

FIG. 9B illustrates a state in which the finder 41 is fixed to the arm plate 82. In the state shown in FIG. 9B, the detection sensor substrate 71, which is wired from the flexible board 46a of the display device 46 and the finder 41, is connected to each of the connectors 53a and 53b of the finder substrate 53 (refer to FIGS. 6A and 6B). Subsequently, the finder substrate unit 51 is positioned with respect to the base plate 32 and fixed by a screw 86.

FIG. 9C illustrates a state in which the finder 41 rotates in the direction of an arrow A in FIG. 9B around the rotation axis 70A. The outer cover 21 is assembled on the base plate 32 from the front side of the finder in the optical axis direction and fixed by a plurality of screws 87. As a result, the first side surface 32c, the second side surface 32d, the plane portion 32e of the base plate 32, which is a structure member, and a side wall 28a of the eyepiece portion 28 are covered with the outer cover 21.

Figure 10:
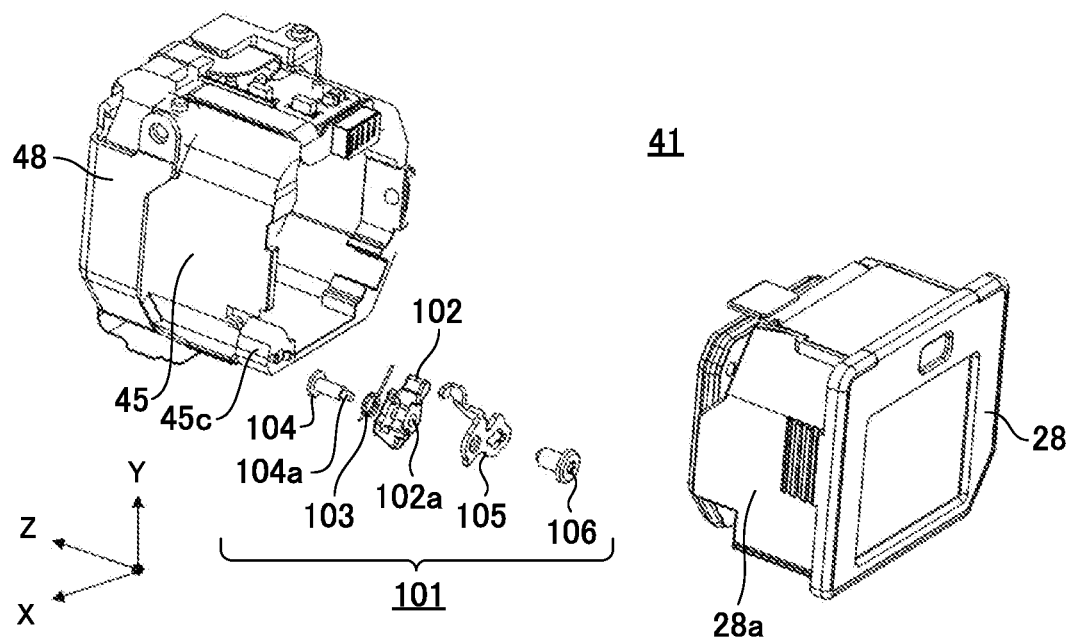
FIG. 10 is an exploded perspective view illustrating a configuration of a slide lock lever unit.

With reference to FIG. 10, a configuration of a slide lock lever unit 101 in the finder 41 will be described. FIG. 10 is an exploded perspective view illustrating the configuration of the slide lock lever unit 101. The slide lock lever unit 101 includes a slide lock lever 102, a biasing spring 103, a rotation shaft 104, a holder member 105, and a fastening screw 106.

The slide lock lever (hereinafter, referred to as a "lock lever") 102 has a hole-shaped part 102a through which the rotation shaft 104 is inserted. The rotation shaft 104 is inserted into the biasing spring 103 and the hole-shaped part 102a of the lock lever 102. In this state, a leading end 104a of the rotation shaft 104 is caulked to the holder member 105. The lock lever 102 has a locking portion 102b to be described below (FIGS. 11A and 11B).

The holder member 105 is attached to the fixed cylinder 45 by the fastening screw 106. The fixed barrel 45 is provided with a fixing part 45c corresponding to the fastening screw 106, and the holder member 105 is fixed to the fixed barrel 45. Thus, the slide lock lever unit 101 is attached to the fixed barrel 45. The lock lever 102 is rotatably held on the rotation shaft 104 in a state of being biased in one rotating direction by the biasing spring 103.

The operation of the lock lever 102 will be described with reference to FIGS. 11A and 11B. FIG. 11A illustrates a rotating position of the lock lever 102 at a position where the eyepiece portion 28 is inserted in the +Z direction at the finder 41. FIG. 11B illustrates a rotating position of the lock lever 102 at a position where the eyepiece portion 28 is extracted in the −Z direction.

Figure 11A:
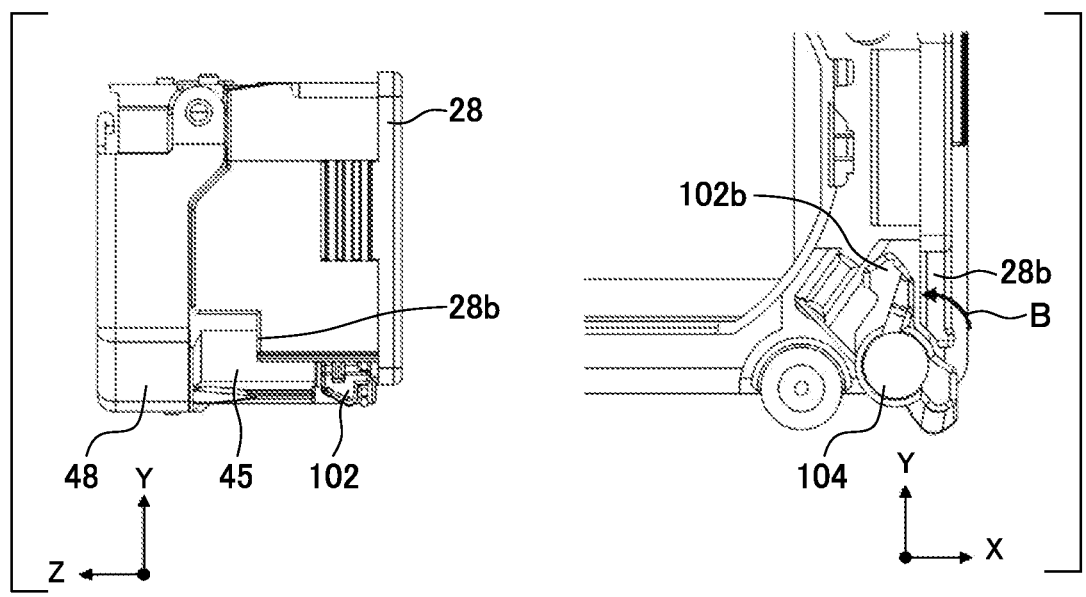
FIGS. 11A and 11B illustrate a slide lock mechanism of the finder unit.
Figure 11B:
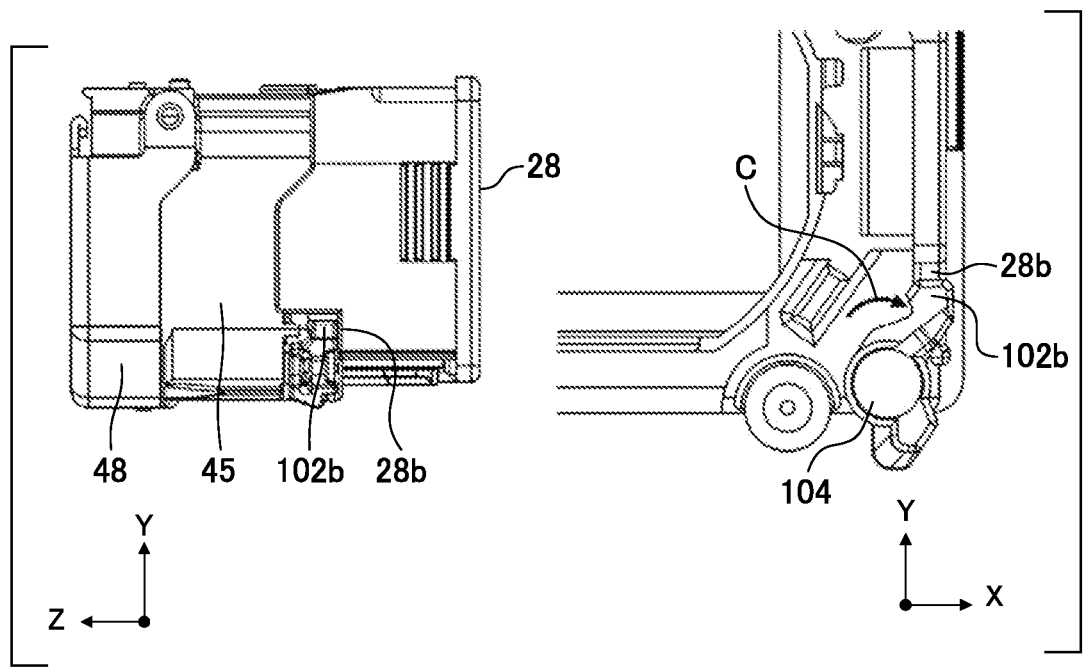

The eyepiece portion 28 shown in FIG. 11A is inserted in the +Z direction. The lock lever 102 is rotationally biased and held by the biasing spring 103 (FIG. 10). The lock lever 102 is rotationally biased in the direction of an arrow B (counterclockwise direction) in the right view of FIG. 11A around the rotation shaft 104. In this state, the locking portion 102b of the lock lever 102 is positioned more toward the inside of the finder unit 20 than a stopper wall 28b formed in the eyepiece portion 28, that is, in the −X direction. Hence, the eyepiece portion 28 can slide in the −Z direction.

The eyepiece portion 28 shown in FIG. 11B is extracted in the −Z direction. The lock lever 102 is rotationally moved in a direction opposite to that in the right view of FIG. 11A due to a configuration to be described below. That is, the lock lever 102 rotates in the direction of an arrow C (clockwise direction) in the right view of FIG. 11B around the rotation shaft 104. In this state, the locking portion 102b of the lock lever 102 is at a position overlapping the projection on the stopper wall 28b formed on the eyepiece portion 28. Therefore, the sliding of the eyepiece portion 28 in the Z direction is limited.

Figure 12A:
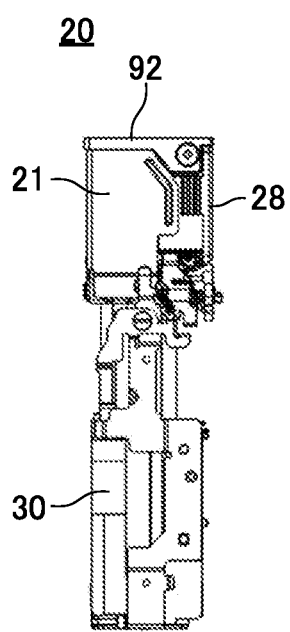
FIGS. 12A to 12D illustrate a sliding operation and a tilting operation of the finder unit.
Figure 12B:
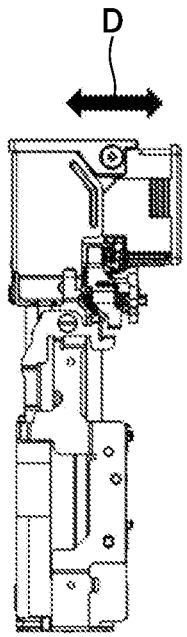

With reference to the operation diagrams shown in FIGS. 12A to 12D, the relation between the operation of the finder unit 20 and the slide lock mechanism of the eyepiece portion 28 will be described. FIG. 12A illustrates a state in which the finder 41 pops up and the eyepiece portion 28 is inserted. FIG. 12B illustrates a state in which the eyepiece portion 28 is extracted from the state of FIG. 12A.

As shown in FIGS. 12A and 12B, the eyepiece portion 28 is slidably held in a direction parallel to the optical axis direction inside the viewfinder (direction of an arrow D in FIG. 12B) in a state in which the tilting rotation (tilting) of the finder 41 is not performed.

Figure 12C:
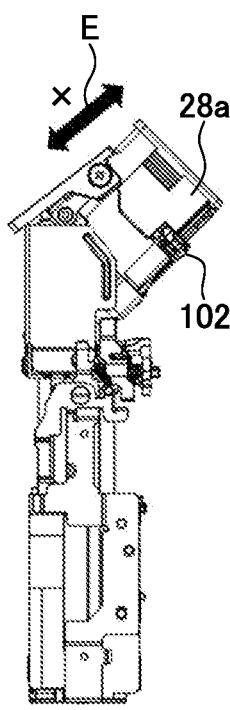
Figure 12D:
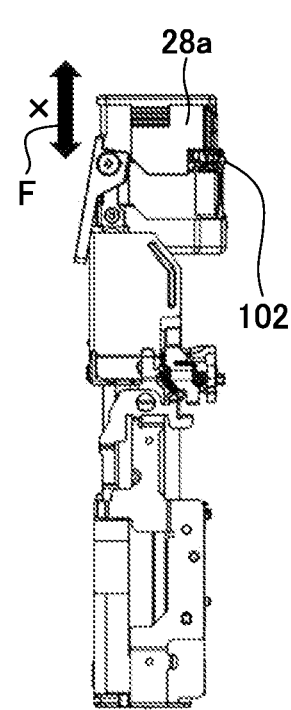

FIG. 12C illustrates a state in which the finder 41 that is being popping up is tilt-rotated further upward. FIG. 12D illustrates a state in which the finder 41 is further tilt-rotated by 90 degrees from the state shown in FIG. 12C. 90 degrees is the maximum angle in this configuration. In the states shown in FIGS. 12C and 12D, the sliding operation of the eyepiece portion 28 in the direction parallel to the optical axis direction inside the finder (directions of an arrow E and an arrow F) is limited by the lock lever 102.

In the present embodiment, the sliding operation of the eyepiece portion 28 is limited during and after the tilting rotating operation of the finder 41 performed by the user. The eyepiece portion 28 can be prevented from sliding in the inserted direction if the user presses the eyepiece portion 28 unintentionally.

Figure 13:
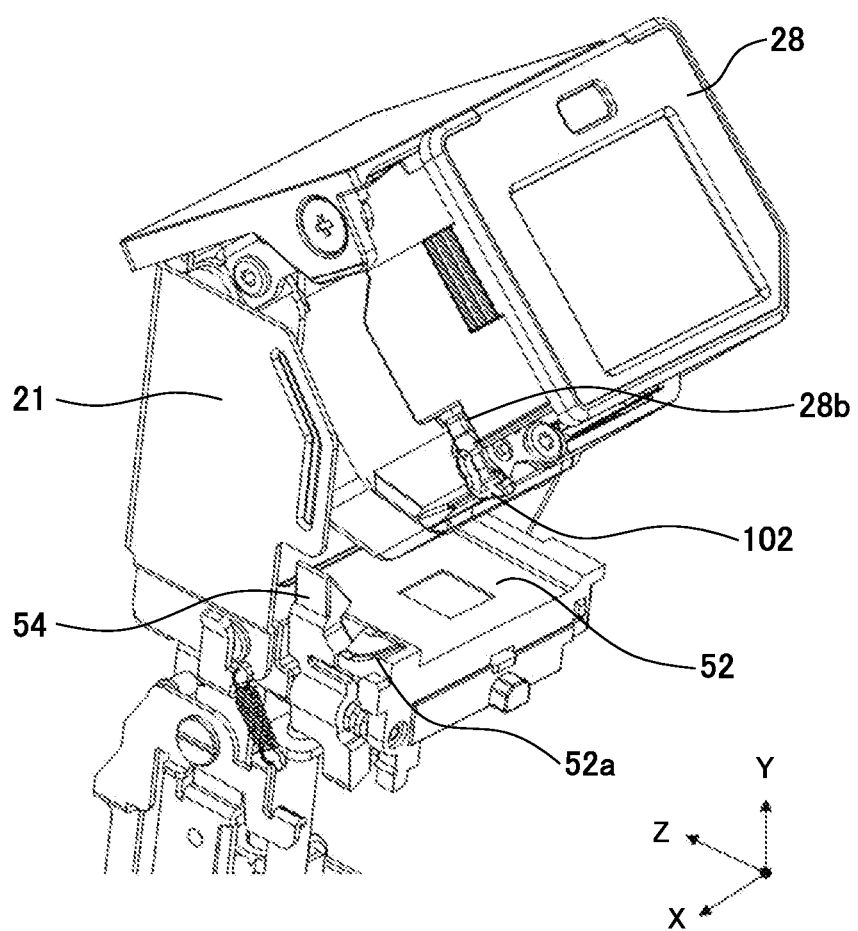
FIG. 13 illustrate switching of states operated by the slide lock lever.

Next, with reference to FIG. 13, a configuration in which the locking member (lock lever 102) performs switching between a state in which the sliding of the eyepiece 28 is permitted and a state in which the sliding of the eyepiece 28 is limited will be described in detail. FIG. 13 is a perspective view illustrating a state in which the finder 41 is tilt-rotated at a predetermined angle. The state shows that the eyepiece portion 28 is extracted in the −Z direction, tilt-rotated upward, and stops. In this state, the lock lever 102 is at the position shown in FIG. 11B, and is in contact with the stopper wall 28b of the eyepiece portion 28 to limit the sliding operation. A cam shape portion 52a is formed on the finder substrate base 52, and the rotation locking member 54 is disposed on the finder substrate base 52. The cam shape portion 52a is formed so that a rotating operation is performed as a result of being brought into contact with the lock lever 102 in a state in which the finder 41 is locked by the rotation locking member 54 (FIGS. 12A and 12B).

Figure 14A:
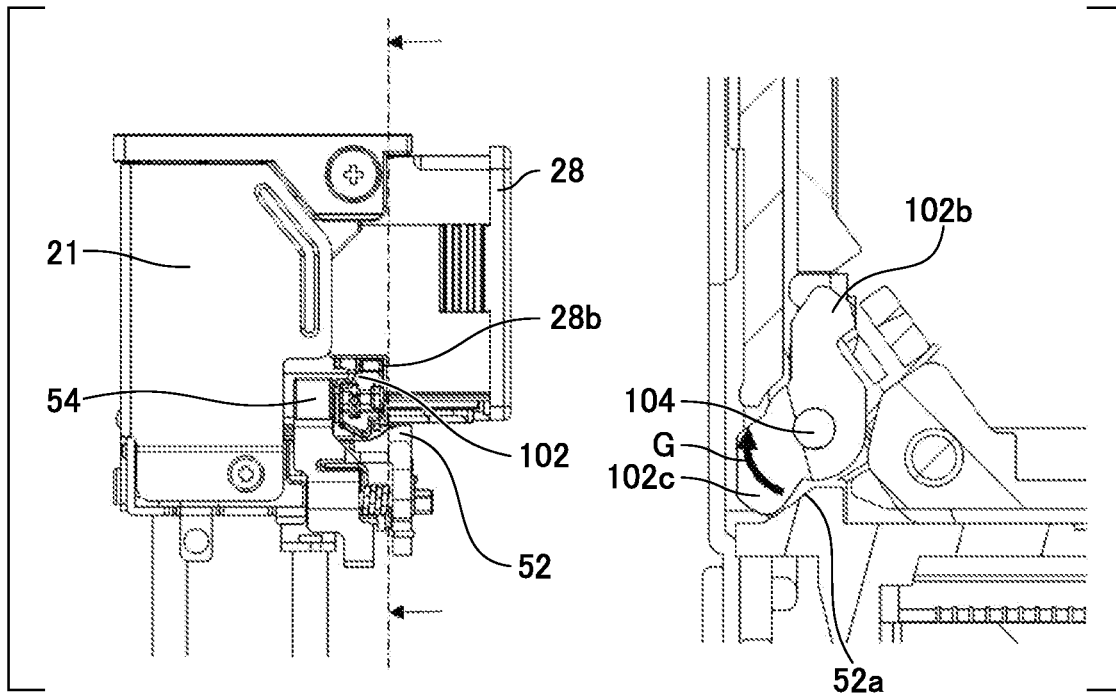
FIGS. 14A and 14B illustrate an operation of the slide lock lever of the finder unit.
Figure 14B:
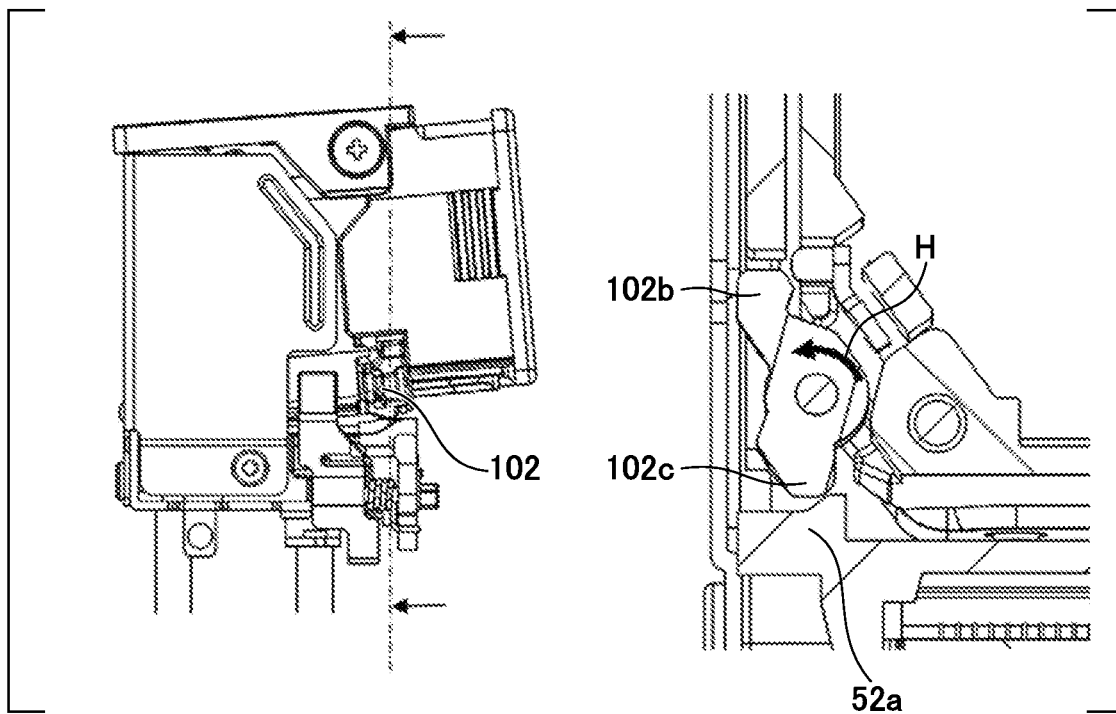

With reference to FIGS. 14A and 14B, a method for a rotating operation for the cam shape portion 52a and the lock lever 102 will be described. FIG. 14A illustrates a state in which locking is performed by the rotation locking member 54 without tilt-operating the finder 41. The lock lever 102 is formed with a slide surface 102c that is brought into contact with the cam shape portion 52a. In the state of FIG. 14A, the slide surface 102c is pressed by the cam shape portion 52a of the finder substrate base 52, and the lock lever 102 rotates in the direction of an arrow G (clockwise direction) on the right side of FIG. 14A. At this time, since the locking portion 102b of the lock lever 102 is positioned more toward the inside of the finder unit (−X direction) than the stopper wall 28b formed in the eyepiece portion 28, the eyepiece portion 28 can slide in the optical axis direction.

FIG. 14B illustrates a state in which the finder 41 is tilt-rotated and the locking by the rotation locking member 54 is released. The slide surface 102c of the lock lever 102 is separated from the cam shape portion 52a and the finder 41 rotates due to the biasing spring 103 (refer to FIG. 10) in the direction shown by an arrow H (counterclockwise direction) in the right side of FIG. 14B. At this time, since the locking portion 102b of the lock lever 102 is at a position overlapping the projection of the stopper wall 28b formed on the eyepiece portion 28, the slide operation of the eyepiece portion 28 in the optical axis direction is limited.

According to the present embodiment, the electronic view finder unit can transition between a retracted state in which the electronic view finder unit is retracted in the main body and a projecting state in which the electronic view finder unit projects from the main body, and the eyepiece portion of the finder unit can move between an extracted position and an inserted position in the optical axis direction of the lens. Changing the rotating position of the lock member in conjunction with the tilting operation of the finder allows performing switching between a state in which the eyepiece portion can move and a state in which the movement of the eyepiece portion is limited or blocked. According to the present embodiment, it is possible to suppress the deterioration of convenience caused by an unintended state of the viewfinder, which is movable between the retracted state and the projecting state and rotatable in the projecting state, and it is possible to prevent the damage to the image pickup apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209338, filed Dec. 17 2020, which is hereby incorporated by reference wherein in its entirety.

What is claimed is:

1. An electronic apparatus that can move between a retracted state in which a display is retracted in a main body and a projecting state in which the display projects from the main body, the display comprising:

a viewfinder having a movable eyepiece portion; and a limiting unit configured to limit a movement of the eyepiece portion, wherein the limiting unit includes a lock member, the electronic apparatus comprising a cam shape portion that is brought into contact with the lock member if the viewfinder moves from a state retracted in the main body to a state projecting from the main body, wherein if the viewfinder is rotated around an axis orthogonal to a moving direction of the eyepiece portion in the projecting state, the limiting unit limits the movement of the eyepiece portion, wherein the limiting unit limits the movement of the eyepiece portion during or after a rotating operation of the viewfinder, wherein during or after the rotating operation of the viewfinder after the eyepiece portion is extracted in a first direction, the lock member is brought into contact with the eyepiece portion and limits the movement of the eyepiece portion in a second direction opposite to the first direction, wherein the lock member disposed on the viewfinder can switch between a first position where the movement of the eyepiece portion is limited and a second position where the movement of the eyepiece portion is not limited, and wherein the cam shape portion causes the lock member to switch between the first position and the second position according to the operation of the viewfinder.

2. The electronic apparatus according to claim 1, further comprising a rotation locking member that limits the rotation of the viewfinder if the viewfinder moves from the retracted state to the projecting state.

3. The electronic apparatus according to claim 1 further comprising:

a mechanism unit configured to move the viewfinder from the retracted state to the projecting state; and a hinge device configured to rotatably connect the viewfinder.

4. The electronic apparatus according to claim 1, wherein the viewfinder includes a display device, and an optical member that guides light emitted from the display device to the eyepiece portion, and wherein if the state transitions to the projecting state, the eyepiece portion can move the optical member in the optical axis direction.

5. The electronic apparatus according to claim 4, wherein in a state in which the viewfinder is in the projecting state and the eyepiece portion is extracted in the optical axis direction of the optical member, the viewfinder is rotatable around an axis orthogonal to the optical axis of the optical member.

* * * * *